Patented Nov. 4, 1924.

1,513,802

UNITED STATES PATENT OFFICE.

FREDERICK D. CRANE, OF MONTCLAIR, NEW JERSEY.

ARTIFICIAL RESINOUS BODY.

No Drawing.  Application filed September 30, 1920. Serial No. 413,890.

*To all whom it may concern:*

Be it known that I, FREDERICK D. CRANE, a citizen of the United States, and having a post-office address at No. 74 North Willow Street, Montclair, county of Essex, and State of New Jersey, have invented certain new and useful Improvements in Artificial Resinous Bodies, of which the following is a specification.

My invention relates to artificial resinous bodies.

In accordance with the present invention artificial resinous bodies are produced by reacting upon an aromatic compound having a benzene ring and one or more attached aliphatic groups, in at least one of which a halogen atom has been substituted, with a compound of the resinous acid or acids in which a metal has been substituted for the acid hydrogen.

Aromatic compounds suitable for use in making the product of the present invention may be, for example, such compounds as benzyl chloride, chlor-xylene, and the like, and suitable rosin acids for use in this connection are, for example, those of pine rosins, ordinarily called abietic acids.

The following examples illustrate manners in which the new product may be made.

A suitable compound is derived from the abietic acid of rosin with an alkali such as caustic potash in the following manner: 98 parts of rosin are heated with 12 parts of caustic potash and 400 parts of water, and the so called "resene," or insoluble portion, may be filtered out, if desired. To the mixture obtained are added 37 parts of commercial benzyl chloride, and the resulting mixture is boiled under a reflux condenser for about four hours. The excess benzyl chloride is then removed, preferably by steam distillation. A resinous mass, somewhat softer than the original rosin, is produced, having a brownish color, the depth of which varies with the quality of rosin used.

Instead of benzyl chloride, chlor xylene may be substituted in the above example, the molecular equivalent thereof being used. The chlor xylene may, if desired, be prepared by the introduction of chlorine into xylene by the usual chlorination method, the equivalent quality of resulting chlorinated compound being then determined by estimation of the chlorine content. The presence of unchlorinated xylene does not inhibit reaction. A resinous product of the same general character as that derived by the use of the benzyl chloride, being somewhat harder, is produced. The corresponding brom-derivative, such as benzyl bromide, brom toluene, etc., may likewise be employed.

The resinous bodies obtained from the abietic acid of rosin in the manner above described may be hydrogenated, if desired, or oxygen may be added thereto by treatment with ozone. In either case the stability of the molecule of the resinous compound is improved. The resinous compound may likewise be vulcanized by the addition of sulphur and moderate heating, with the formation of a hardened product having the characteristics of varnish gum.

Before treatment with the alkali and the aromatic compounds of the character described, the rosin may be subjected to the action of an alcoholic solution of hydrochloric acid, which is generally regarded as resulting in the splitting of the abietic acid into two acids having generally similar properties to the abietic acid. The proportion of the halogenated aromatic compound used in this case must be doubled, the method of procedure otherwise remaining the same. The resulting resinous compound is of the same general character as that derived from the abietic acid, being, however, somewhat softer.

The acidic varnish gums, such as animi or elemi, may be substituted for the rosins in the examples above given. The product resulting from the present invention may be utilized in the production of chewing gums, varnishes, plastics, sizing, waterproofing material for papers, and generally as substitutes for resinous and varnish gums.

It is believed that the resinous bodies obtained as above described are of the character of esters, the composition of which may be generally expressed by the formula RCOOR', in which —R— represents the radical of the acid constituent of the rosin, and —R'— represents an aromatic body having a benzene ring to which one or more aliphatic groups are attached.

The examples and theory above recited are given for the purpose of affording an understanding of the invention and ways in which it may be carried out; but it is not intended that the details of the examples nor the theories hereinbefore expressed are to be regarded as limitations on the scope of the invention.

I claim:
1. As a new article of manufacture, a benzyl ester of a resinous acid material.
2. As a new article of manufacture, an ester benzyl resinate or abietate.

In witness whereof, I have signed my name hereto.

FREDERICK D. CRANE.